Patented Mar. 22, 1927.

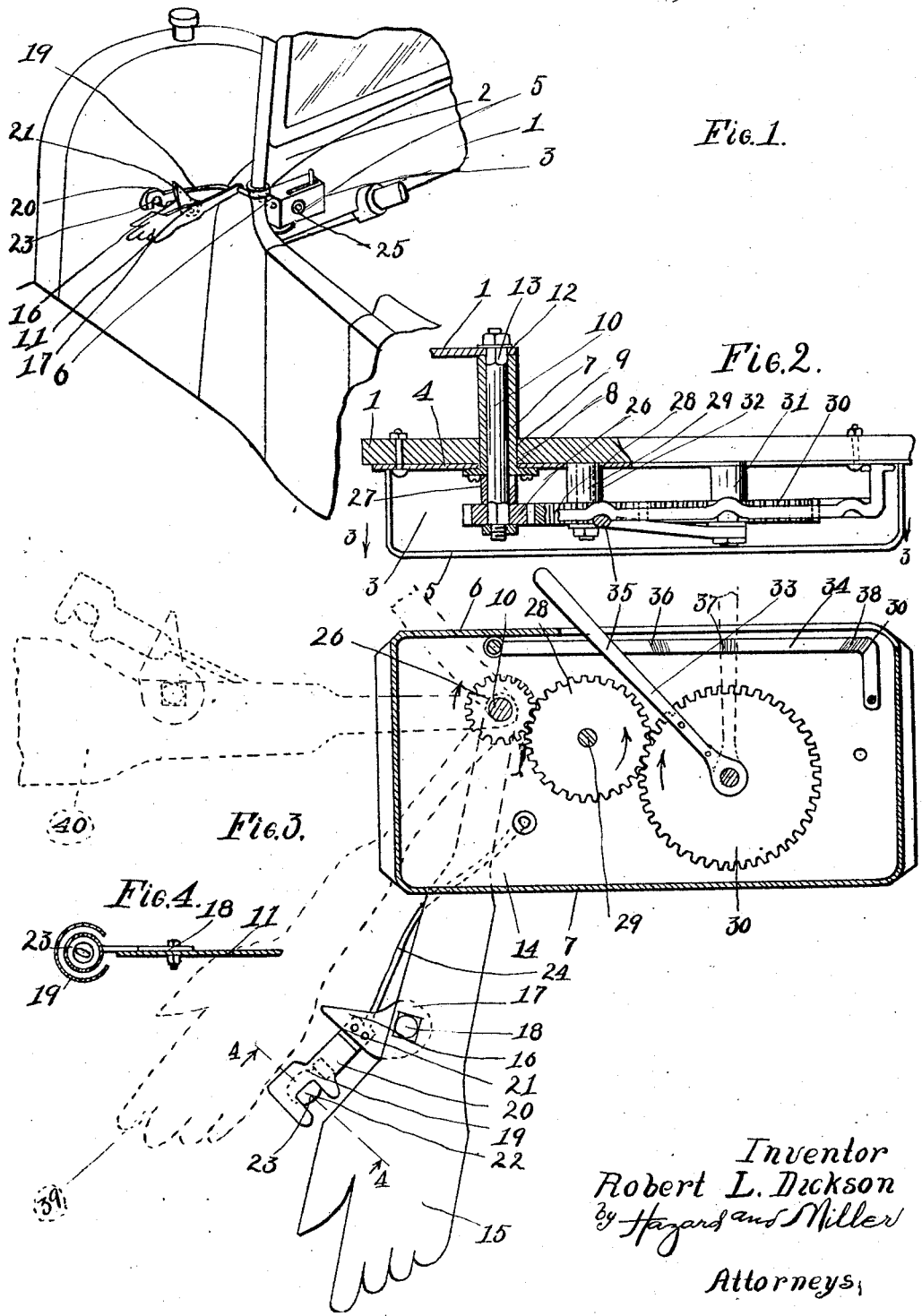

1,622,096

UNITED STATES PATENT OFFICE.

ROBERT L. DICKSON, OF LONG BEACH, CALIFORNIA.

AUTOMOBILE SIGNAL.

Application filed November 24, 1925. Serial No. 71,123.

My invention is an automobile signal of the semaphore signal arm type adapted to be swung into several different positions to give the conventional indicating signals, the arm being continuously illuminated at night.

An object of my invention is a semaphore signal arm type of signal, adapted to be attached to a vehicle, the arm being pivoted to swing vertically in an arc of a circle and having a lamp suitably mounted to illuminate both sides of the arm.

A further object of my invention is to provide a hand lever operating the signal arm through the train of gears and having sockets to hold the handle in various positions and thus the signal arm in definite conventional signalling positions. My semaphore arm is adapted to give such conventional signals as a downward inclination of 45 degrees to indicate a stop signal, a horizontal position to indicate a left turn and an upwardly inclined position of 45 degrees to indicate a right turn.

My automobile signal considered generally, comprises a pivotally mounted semaphore arm being preferably swivelled to a swivel shaft suitably mounted on a vehicle, the arm carrying a bracket and having a lamp secured to the bracket adapted to illuminate opposite sides of the semaphore or signal arm.

A further feature of my invention comprises a housing or gear box forming a journal for the swivel shaft with a train of gears therein and a hand lever connected to one of the gears operable into one of several positions to give conventional signals.

My invention will be more readily understood from the following description and drawings, in which:

Fig. 1 is a perspective view of part of an automobile showing my signal or semaphore arm attached adjacent the windshield of an automobile and projecting outwardly from the cowl.

Fig. 2 is a horizontal section through the gear box, indicating a train of gears for operating the semaphore or signal arm.

Fig. 3 is an elevation partly in section of the gear box, the semaphore signal arm and the hand lever to operate the train of gears and hence the arm.

Fig. 4 is a detail section on the line 4—4 of Fig. 3 in the direction of the arrows, showing the mounting for a lamp.

The general mounting of my invention is indicated particularly in Figs. 1 and 2, in which the numeral 1 designates a board such as a dash board at the back of the cowl 2 of an automobile and a gear box 3 is attached to the back of the board. This box contains the gearing hereafter described and supports the signal arm.

The box is constructed with a plate 4 bolted to the board 1 and with a cover 5 extending inwardly and with the top 6 and bottom 7 forming an enclosure for the train of gears. A sleeve 7 is secured to the plate 4 and extends through an aperture 8 in the plate and an aperture 9 in the board 1 projecting through the cowl 2 as shown in Fig. 1. This sleeve contains a swivel shaft 10 on which is mounted a signal arm 11. This arm is formed with a sheet of metal having a squared aperture 12 mounted on the squared end 13 of the shaft 10 and having a narrow inner section 14 and a wide outer section 15 shaped to simulate a person's hand, the fingers pointing. The arm is flat in a vertical plane and the shaft 10 is mounted to swivel on a horizontal axis parallel to the hand, thus swinging the arm in a vertical plane.

A bracket 16 formed of a flat plate of somewhat triangular shape with an enlarged boss 17 is fastened to the arm by means of a bolt 18 and forms a support for the lamp holder 19. This housing has a cylindrical portion 20 for the lamp socket and a flattened end 21 riveted to the bracket 16. The lamp holder has an arcuate slot or opening 22 adapted to allow the light to shine from the lamp bulb 23 on both sides of the end portion 15 of the signal arm. Electric leads 24 extend from the lamp holder to the gear box which is provided with a switch 25 for the light.

The gears for operating the signal arm are shown particularly in Figs. 2 and 3 and comprise a driven gear 26 on a squared end of the swivel shaft 10 and spaced from the plate 4 by a sleeve 27. An idler gear 28 is mounted on a stub shaft 29 and a driving gear 30 is mounted on another stub shaft 31.

These shafts are fixed and provided with sleeves 32 spacing the gears from the plate 4. A hand lever 33 is rigidly secured to the gear 30 so as to rock said gear when the hand lever arm is swung to the different signalling positions as hereafter described.

A bar 34 is secured inside the gear box and has a series of indentations or sockets designated 35, 36, 37 and 38. The lever arm is formed of spring material tensioned to press against the bar 30 and will rest in the various sockets when the lever arm is swung to such position.

In the illustration of Fig. 3, the lever arm is shown in the idle position with the signal arm hanging downwardly out of a signalling position. When it is desired to give a stop signal the hand lever is moved to the socket 36, thus moving the signal arm to the dotted position 39 and has a downward inclination of substantially 45 degrees. The left turn signal is given by swinging the handle to the socket 37, thus positioning the signal arm horizontally as indicated by the numeral 40. For the right turn signal the arm is swung to the groove 38 inclining the signal arm upwardly at an angle of 45 degrees.

It will thus be seen that a simple manipulation of the hand lever swings the signal arm into the various positions to give the conventional automobile signals of "stop", "left" and "right" turn and in the idle position it gives no signal. For use at night the switch is turned to the "on" position, thus giving a continuous illumination on the signal arm.

It will be apparent that my signal arm could be attached to different parts of an automobile and operated by a train of gears in the manner above described and may be adapted to be secured to differents parts of a vehicle, without departing from the spirit of my invention. Changes may be made in the general design and specific features as set forth in the description, drawings and claims, these being within the scope of my invention.

Having described my invention, what I claim is:

1. An automobile signal comprising in combination a pivoted shaft suitably mounted on a vehicle, a flat signal arm rigidly attached to said shaft, a bracket secured to the arm and extending from one edge thereof, a lamp holder secured to the bracket and extending along one edge of the arm, and having an arcuate opening facing the edge of the arm, a lamp positioned in the holder to shine through the opening thereof on to the edge and opposite side faces of said arm.

2. In an automobile signal, a signal arm having an indicator pointer mounted on a vehicle, said pointer being constructed of a flat plate, a flat sheet metal bracket attached to the pointer, one of the faces of the bracket and one of the faces of the pointer contacting and the bracket extending beyond one edge of the pointer, an upper lamp holder having a flattened end with said end attached to the bracket, a holder extending along one edge of the pointer, the holder having a slot or opening therein and the lamp in the holder positioned to shine through the opening on to the edge and two sides of the pointer.

3. In an automobile signal, a signal arm mounted on a pivot, said arm being constructed of a flat plate having a pointer structure at the outer end, a flat sheet metal bracket attached to the pointer arm, one of the faces of the bracket and one of the faces of the plate contacting, a lamp holder attached to the bracket and extending over the edge of the pointer arm, said lamp holder being adapted to support a lamp, whereby the light from the said lamp will illuminate both sides of the pointer arm.

In testimony whereof I have signed my name to this specification.

R. L. DICKSON.